UNITED STATES PATENT OFFICE.

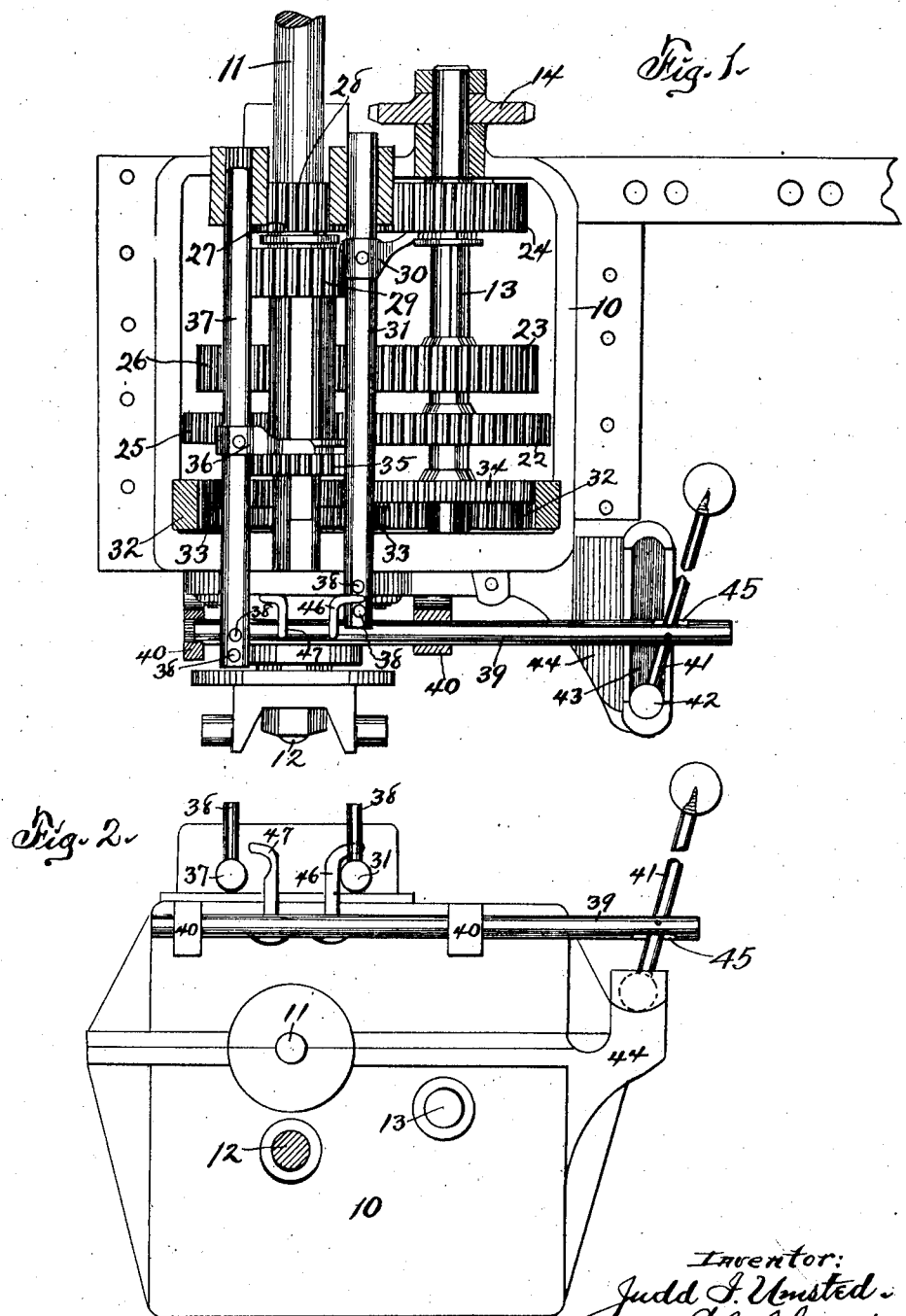

JUDD IRWIN UMSTED, OF DAYTON, IOWA.

OPERATING DEVICE FOR GEAR-SHIFTING MECHANISM.

1,331,685. Specification of Letters Patent. Patented Feb. 24, 1920.

Original application filed July 30, 1917, Serial No. 183,416. Divided and this application filed December 7, 1918. Serial No. 265,691.

*To all whom it may concern:*

Be it known that I, JUDD I. UMSTED, a citizen of the United States of America, and resident of Dayton, Webster county, Iowa, have invented a new and useful Operating Device for Gear-Shifting Mechanism, of which the following is a specification.

The subject matter of this invention was originally included in and has been divided from my application filed July 30, 1917, Serial Number 183,416.

The object of this invention is to provide an improved construction for operating devices for gear-shifting mechanism.

My invention consists in the construction, arrangement and combination of elements hereinafter set forth, pointed out in my claims and illustrated by the accompanying drawing, in which—

Figure 1 is a plan, partly in section, of a transmission mechanism illustrating my improved gear-shifting devices in connection therewith. Fig. 2 is a rear end elevation of the same.

The transmission mechanism here shown is adapted for use in applying power to both the front and rear supporting wheels of the vehicle on which it is mounted, and includes generally a transmission housing 10 in which a driving shaft 11 is journaled and adapted to be connected at one end to the crank shaft of the prime mover. Jack shafts or countershafts 12, 13 are journaled in the housing 10 parallel with the driving shaft 11, and the countershaft 12 is adapted to be secured at one end to a power transmission shaft leading to the differential mechanism of the rear axle assembly, while the countershaft 13 is adapted to be connected in any suitable manner, as through sprocket gearing 14, a portion only of which is shown, to a power transmission shaft (not shown) leading to the differential mechanism of the front axle assembly. Pinions 22, 23 and 24 of varying sizes are mounted on the countershaft 13 and spaced apart longitudinally thereof, the pinions 22, 23 being fixed to the shaft 13 while the pinion 24 is mounted for reciprocation thereon. Pinions 25, 26 and 27 are mounted on the countershaft 12 laterally opposite to but disconnected from the pinions 22, 23 and 24, the pinions 25, 26 being fixed to the shaft 12 while the pinion 27 is arranged for reciprocation on said shaft. A driving gear 28 is mounted rigidly on the driving shaft 11 and a driving gear 29 is mounted for reciprocation on said shaft. A three-armed clutch spider 30 is fixed to a shifting rod 31 mounted for reciprocation in the housing parallel with the shafts therein and the extremities of the arms of said spider are forked or otherwise suitably constructed to engage portions of the pinions 24 and 27 and the driving gear 29 and shift them longitudinally of their respective shafts at times. An internal gear 32 is journaled in the housing 10 and surrounds all of the shafts therein. A pinion 33 is mounted rigidly on the countershaft 12 and meshes with the internal gear 32, and a pinion 34 is fixed to the countershaft 13 and meshes with said internal gear. A driving gear 35 is mounted for reciprocation on the driving shaft 11 and is adapted to mesh at times with the internal gear, with the pinion 22, or be at rest between said gear and pinion, selectively. A shifting arm 36 is mounted on a shifting rod 37, the latter being mounted for reciprocation in the transmission case 10 parallel with the shifting rod 31 and shafts in said case. The shifting rods 31 and 37 project through and outside of the transmission case or housing 10 and are formed with upwardly extending spaced studs 38 arranged in pairs on their outer ends.

My present invention relates to means for operating the shifting rods 31 and 37 to shift the reciprocating pinions and gears within the transmission housing, to vary the speed or direction of travel of the transmission shafts leading to the traction wheels of the vehicle. An operating bar 39 is mounted for oscillation rotatively on its longitudinal axis and also is arranged for rectilinear reciprocation in suitable bearings 40 which may be carried by the transmission housing 10. A shifting lever or controller 41 is fulcrumed by means of a ball 42 on its lower end in an arcuate channel or groove 43 formed in and opening upwardly from a bracket 44, which may be carried by the housing 10. The shifting lever or controller 41 is secured to the outer end portion of the operating bar 39 as by extending said lever loosely through a slot 45 in and arranged longitudinally of said bar. An H-slot housing (not shown) of common form may be superposed relative to the bracket 44 and in embracing relation to the lever or controller 41 to guide the operator in manipulating the lever. The operating bar 39 is formed with upwardly extending hooked arms or hooks 46, 47 spaced apart and having their extremities turned away from each other. The hooked arms 46, 47 extend across the horizontal plane of the shifting bars 31 and 37 and are adapted to extend selectively within pairs of the studs 38. In one position of the operating bar 39 the hook 46 will engage the studs on the bar 31; in another position the hook 47 will engage the studs on the shifting bar 37; and in yet another position both hooks will be disengaged from said studs and neutral relative to any operation of the shifting bars.

The mechanism as illustrated is connected in "high"; that is to say the movement of the driving shaft 11 is communicated through the gear 28 to the pinions 24 and 27 to the end of rotating the shafts 13 and 12 respectively in the same direction and at approximately the same speed as that of the engine shaft, although it may be reduced or increased by varying the size of the driving gear 28 relative to a size common to said pinions. When it is desired to shift from high to intermediate speed the lever 41 is moved rearwardly at its upper end and the ball 42 travels from the end shown to the center of the channel 43. Such movement of the lever 41 turns the operating bar 39 on its axis and causes the arm 46 to move the shifting bar 31 rearwardly. The shifting bar 31 in turn moves the spider 30 toward the center of the transmission case and withdraws the pinions 24 and 27 from meshing with the driving gear 28 and also moves the driving gear 29 nearer to the pinions 23 and 26. A continuation of rearward movement of the upper end of the lever 41 causes the shifting bar 31 and spider 30 to move the driving gear 29 into mesh with the pinions 23 and 26 and said pinions 23 and 26 being of relatively larger diameter than the pinions 24 and 27, and the gear 29 being of relatively smaller diameter than the gear 28, the speed transmitted by such meshing is reduced. When it is desired to vary the speed from intermediate to low the lever 41 is moved so that the ball 42 is in the center of the channel 43; the lever 41 is then moved laterally, fulcruming on the ball 42 in the channel, in such manner as to move the bar 39 longitudinally and disconnect the hook 46 from the studs on the bar 31 and connect the hook 47 with the studs 38 on the bar 37; which done the lever 41 is moved forwardly at its upper end (the ball 42 traveling toward and to the rear end of the channel 43), thus turning the bar 39 on its axis and causing the hook 47 to move the shifting bar 37 and spider 36 so as to bring the driving gear 35 into mesh with the pinions 22 and 25. When it is desired to shift from low to reverse, the movement of the lever 41 is rearwardly at its upper end so as to cause the bar 39 to rotate on its axis and move the shifting bar 37 and arm 36 so as to disengage the driving gear 35 from the pinions 22 and 25 and bring it into mesh with the internal gear 32. Inasmuch as the internal gear 32 is at all times in mesh with the pinions 33 and 34, such engagement of the driving gear 35 therewith reverses the direction of travel of the countershafts 12 and 13 and all of the follower mechanisms connected therewith. Disengagement of the gears may be effected at any time by forward or rearward movement of the lever 41 to neutral position, and disengagement of all of the transmission devices may be effected by moving the lever to an upright or neutral position in respect of inclination laterally of the path of travel.

I claim as my invention—

1. In a driving gear and transmsision, an operating bar mounted for oscillation and rectilinear reciprocation, said bar being formed with a longitudinal slot, a bracket formed with an arcuate groove, and a lever loosely mounted through said slot, one end of said lever engaging slidingly and for oscillation in said arcuate groove.

2. In a driving gear and transmission, an operating bar mounted for oscillation and rectilinear reciprocation, said bar being formed with a longitudinal slot, a bracket formed with an arcuate groove, and a lever loosely mounted through said slot, one end of said lever being formed with a ball adapted for oscillation and also for orbital travel in said arcuate groove.

3. In a driving gear and transmission having a plurality of spaced shifting rods mounted for rectilinear reciprocation and each formed with spaced projecting studs, the combination with said shifting rods of operating means comprising a bar mounted for oscillation and for rectilinear reciprocation transversely of said shifting rods, said bar being formed with spaced hooks adapted for selective engagement with the studs of said rods or for neutral position between them, a bracket formed with an arcuate groove, and a lever loosely engaging said bar, one end of said lever being formed with a ball adapted for oscillation and also for orbital travel in said arcuate groove.

Signed at Dayton, in the county of Webster and State of Iowa, this 8th day of July, 1918.

JUDD IRWIN UMSTED.